(12) United States Patent
Zhang et al.

(10) Patent No.: US 11,829,342 B2
(45) Date of Patent: Nov. 28, 2023

(54) MANAGING LOCK INFORMATION ASSOCIATED WITH A LOCK OPERATION

(71) Applicant: EMC IP Holding Company LLC, Hopkinton, MA (US)

(72) Inventors: Ming Zhang, Beijing (CN); Shuo Lv, Beijing (CN); Lei Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 195 days.

(21) Appl. No.: 17/029,498

(22) Filed: Sep. 23, 2020

(65) Prior Publication Data

US 2022/0035787 A1 Feb. 3, 2022

(30) Foreign Application Priority Data

Jul. 31, 2020 (CN) .......................... 202010760320.2

(51) Int. Cl.
*G06F 16/23* (2019.01)
*G06F 16/22* (2019.01)

(52) U.S. Cl.
CPC ...... *G06F 16/2343* (2019.01); *G06F 16/2237* (2019.01)

(58) Field of Classification Search
CPC .................. G06F 16/2343; G06F 16/2237
See application file for complete search history.

(56) References Cited

U.S. PATENT DOCUMENTS

| | | | |
|---|---|---|---|
| 9,460,102 B1 | 10/2016 | Bono et al. | |
| 9,460,144 B2* | 10/2016 | Brower | G06F 16/2343 |
| 2004/0083347 A1* | 4/2004 | Parson | G06F 16/9014 |
| | | | 707/E17.036 |
| 2007/0061546 A1* | 3/2007 | Berger | H03M 7/30 |
| | | | 711/202 |
| 2013/0086348 A1* | 4/2013 | Marathe | G06F 9/526 |
| | | | 711/163 |
| 2017/0052859 A1* | 2/2017 | Scouller | G06F 3/0647 |
| 2017/0193070 A1* | 7/2017 | Miller | G06F 16/2343 |
| 2018/0060318 A1* | 3/2018 | Yang | G06F 16/2255 |
| 2018/0260429 A1 | 9/2018 | Bhargava et al. | |
| 2018/0373750 A1 | 12/2018 | Zhu et al. | |
| 2019/0303468 A1* | 10/2019 | Park | G06F 16/24552 |
| 2020/0159845 A1 | 5/2020 | Xue et al. | |

* cited by examiner

*Primary Examiner* — Hares Jami
(74) *Attorney, Agent, or Firm* — BainwoodHuang

(57) ABSTRACT

Storage management techniques involve determining, if it is determined that lock information associated with a lock operation performed on an object is to be inserted into a storage device, a target digest for representing the lock information; determining whether an idle index not associated with a historical digest exists in an index array for indicating a plurality of storage positions in the storage device; and inserting, if it is determined that an idle index exists in the index array, the lock information into a target storage position in the plurality of storage positions by associating the target digest with the idle index. Accordingly, lock information can be quickly inserted and cleared, thereby improving the system performance.

18 Claims, 6 Drawing Sheets

MANAGING LOCK INFORMATION ASSOCIATED WITH A LOCK OPERATION

CROSS-REFERENCE TO RELATED APPLICATION

This application claims priority to Chinese Patent Application No. CN202010760320.2, on file at the China National Intellectual Property Administration (CNIPA), having a filing date of Jul. 31, 2020, and having "METHODS, ELECTRONIC DEVICES AND COMPUTER PROGRAM PRODUCTS FOR STORAGE MANAGEMENT" as a title, the contents and teachings of which are herein incorporated by reference in their entirety.

TECHNICAL FIELD

Embodiments of the present disclosure generally relate to storage systems, and more particularly, to a method, an electronic device, and a computer program product for storage management.

BACKGROUND

In a lock tracking system (TRS), it is required to use a buffer cache to consume inline lock pairs, that is, when a new locking instruction arrives, relevant information data of a locking action and a lock address is inserted into a database. When an unlocking instruction arrives, the database may be searched to see whether the unlocking instruction corresponds to the lock address that has been inserted. If yes, locking-related information data is deleted; otherwise, the locking-related information data is inserted into the database.

SUMMARY OF THE INVENTION

The embodiments of the present disclosure relate to an improved solution for storage management.

In a first aspect of the present disclosure, a method for storage management is provided. The method includes determining, if it is determined that lock information associated with a lock operation performed on an object is to be inserted into a storage device, a target digest for representing the lock information; determining whether an idle index not associated with a historical digest exists in an index array for indicating a plurality of storage positions in the storage device; and inserting, if it is determined that an idle index exists in the index array, the lock information into a target storage position in the plurality of storage positions by associating the target digest with the idle index.

In a second aspect of the present disclosure, an electronic device is provided. The electronic device includes at least one processor; and at least one memory storing computer program instructions, the at least one memory and the computer program instructions being configured to cause, with the at least one processor, the electronic device to perform actions. The actions include determining, if it is determined that lock information associated with a lock operation performed on an object is to be inserted into a storage device, a target digest for representing the lock information; determining whether an idle index not associated with a historical digest exists in an index array for indicating a plurality of storage positions in the storage device; and inserting, if it is determined that an idle index exists in the index array, the lock information into a target storage position in the plurality of storage positions by associating the target digest with the idle index.

In a third aspect of the present disclosure, a computer program product is provided. The computer program product is tangibly stored on a non-volatile computer-readable medium and includes computer-executable instructions. When executed, the machine-executable instructions cause a device to perform the method in the first aspect.

It should be understood that the content described in the summary part is neither intended to limit key or essential features of the embodiments of the present disclosure, nor intended to limit the scope of the present disclosure. Other features of the present disclosure will become readily understandable through the following description.

BRIEF DESCRIPTION OF THE DRAWINGS

The above and other objectives, features, and advantages of the embodiments of the present disclosure will become readily understandable by reading the following detailed description with reference to the accompanying drawings. In the accompanying drawings, several embodiments of the present disclosure are shown in an example rather than restrictive manner, where.

Throughout the accompanying drawings, the same or similar reference numerals are used to indicate the same or similar components.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The principles and spirits of the present disclosure will be described below with reference to some example embodiments shown in the accompanying drawings. It should be understood that these specific embodiments are described only for the purpose of enabling a person skilled in the art to better understand and then implement the present disclosure, instead of limiting the scope of the present disclosure in any way.

Figure 1:
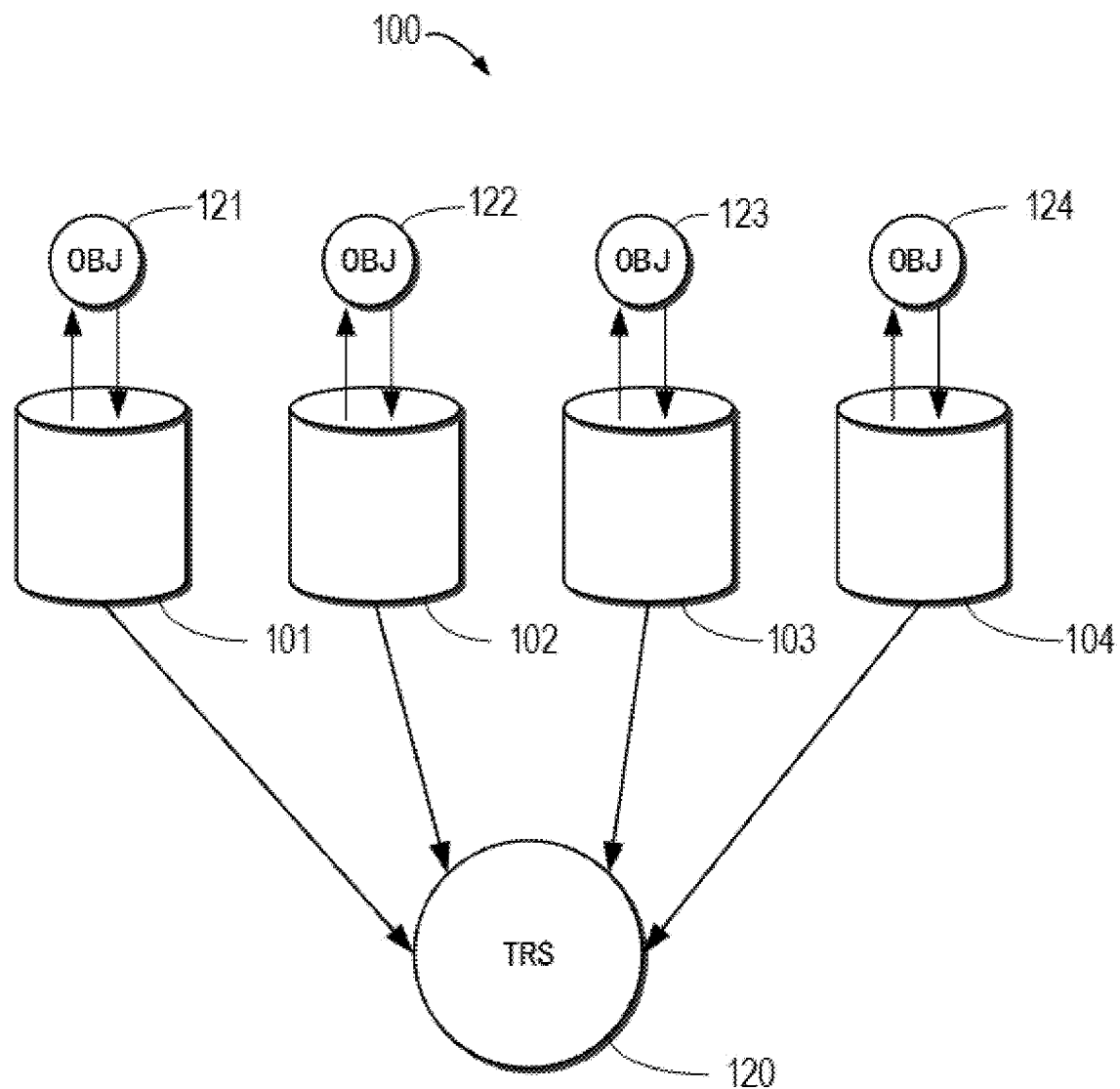
FIG. 1 is a block diagram of an example system in which an embodiment of the present disclosure can be implemented.

FIG. 1 is a schematic diagram of example system 100 in which an embodiment of the present disclosure can be implemented. As shown in FIG. 1, system 100 may include lock tracking system (TRS) 120. System 100 may further include storage devices 101 to 104. Storage devices 101 to 104 may be connected to TRS 120, respectively.

When a lock operation is performed on an object, all information associated with the lock operation may be inserted into the storage devices. For example, lock information associated with a lock operation performed on object 121 may be inserted into storage device 101, and lock information associated with a lock operation performed on object 122 may be inserted into storage device 102, lock information associated with a lock operation performed on object 123 may be inserted into storage device 103, and lock information associated with a lock operation performed on object 124 may be inserted into storage device 104.

If unlock information associated with an unlock operation performed on an object is received, lock information that is associated with the lock operation performed on the object and has been previously inserted into a storage device may be cleared from the storage device. If no lock information corresponding to the unlock information exists in the storage device, the unlock information is inserted into the storage device.

Storage devices 101 to 104 shown in FIG. 1 may be a micro database, and it should be understood that system 100 may include any number of storage devices. Storage devices 101 to 104 shown in FIG. 1 are for example purposes only.

For the TRS, on the one hand, it is expected that when a new locking instruction arrives, relevant information data of a locking action and a lock address can be quickly inserted into the database. When an unlocking instruction is received, it can be quickly found in a system whether a lock address corresponding to an unlock address in the unlocking instruction exists, so as to clear the corresponding lock information from the system. On the other hand, a problem may arise that if a large amount of lonely unlock information is inserted into the system, that is, the system has no corresponding lock information corresponding to such lonely unlock information, the system is easy to be locked once a large amount of storage space in the system is occupied by such unlock information and there is no chance to clear such unlock information.

Therefore, the embodiments of the present disclosure provide a method for storage management. In the method, if it is determined that lock information is to be inserted into a storage device, a target digest for representing the lock information is determined. If it is determined that an idle index not associated with a historical digest exists in an index array for indicating a plurality of storage positions in the storage device, the lock information is inserted into a target storage position in the plurality of storage positions by associating the target digest with the idle index. In this way, lock information can be quickly inserted and cleared, thereby improving the system performance.

Figure 2:
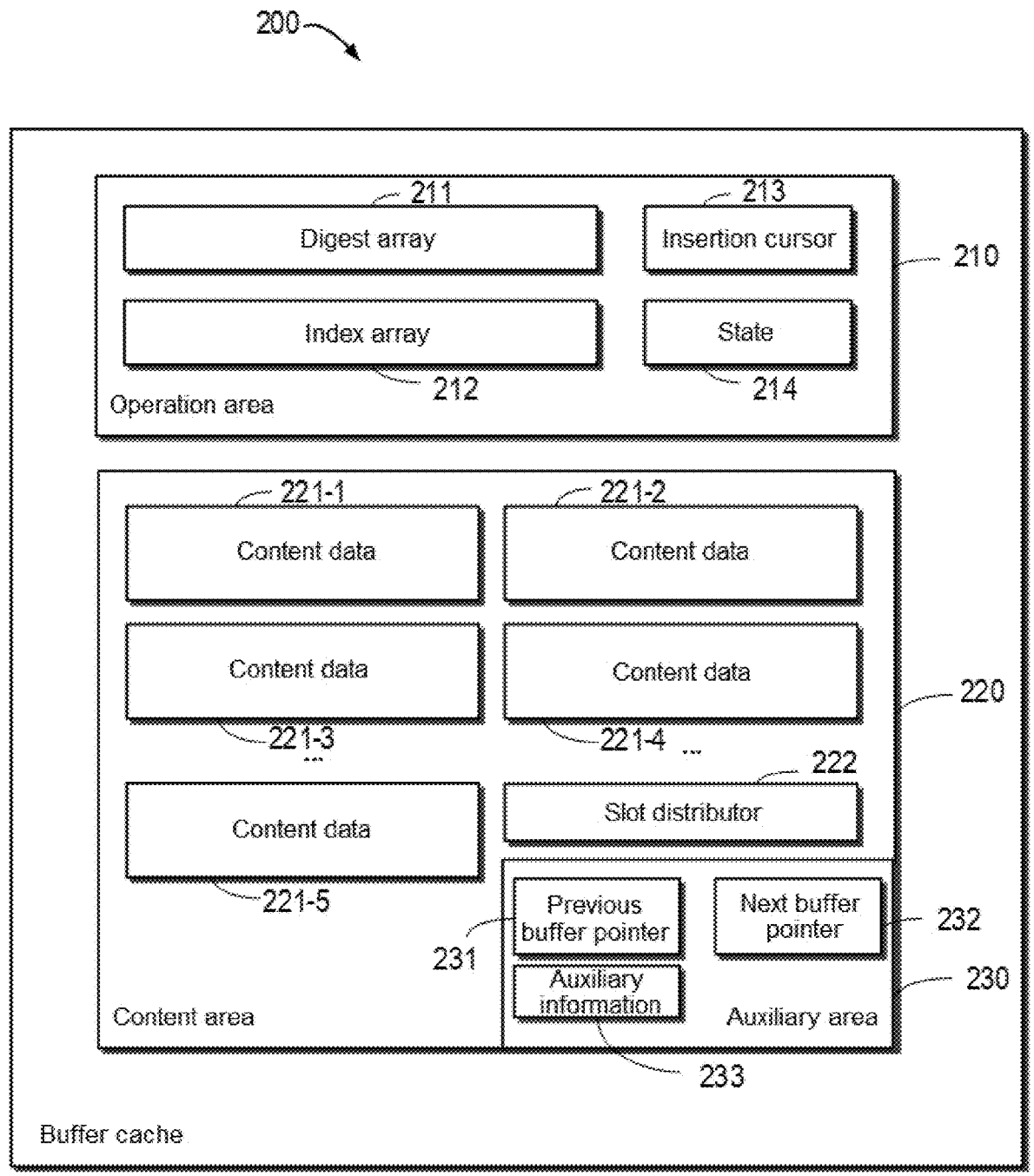
FIG. 2 is a schematic diagram of an example architecture of the storage device in FIG. 1.

The embodiments of the present disclosure will be described in more detail below with reference to the accompanying drawings. FIG. 2 is a schematic architectural diagram of storage device 200 according to an embodiment of the present disclosure. Storage device 200 shown in FIG. 2 may be a buffer cache of 8 K bytes, which is regarded as any one of storage devices 101 to 104 shown in FIG. 1.

As shown in FIG. 2, storage device 200 may include operation area 210, content area 220, and auxiliary area 230. The reason for dividing the buffer in such a manner is to avoid keeping loading a memory in a "long jump" manner. A CPU relies heavily on an L2 cache and an L3 cache. It is advantageous for the CPU to centralize frequently accessed data and make such data continuous.

Operation area 210 may include digest array 211. Digest array 211 stores a digest of each piece of content data, which grows sequentially with an insertion cursor. After the content data is deleted, holes may appear in the positions where the digests were originally stored. Unless a compression operation is performed, the holes may not be used as candidate positions where new digests are to be inserted.

Operation area 210 may further include index array 212. Index array 212 stores a slot number of the content data, which has a completely corresponding positional relationship with the digest array. This means that if a digest of an object is stored in a digest array "i," an index array "i" should point to a slot where content data of the object is stored.

In addition, operation area 210 may further include input cursor 213, which may indicate a position where the digest array or the index array is to be inserted next time. The insertion position indicates a starting point for the next delete or search operation. Operation area 210 may further include state area 214. Historical record information of each operation is indicated in state area 214. For example, in the TRS, when any delete operation fails due to the lonely unlock information, this state will be set to a "refresh required" state. When this buffer is to be released, all the content data will be refreshed to a TRS subsystem.

Content area 220 may include content data 221 and slot distributor 222. Content data 221 is a position where object-related lock information is actually stored, and slot distributor 222 may indicate an available position where content data is stored, which may be regarded as a four level binary search tree.

In addition, auxiliary area 230 may include previous buffer pointer 231, next buffer pointer 232, and auxiliary information 233. Previous buffer pointer 231 and next buffer pointer 232 may indicate link information between storage device 200 and other storage devices in the system, and auxiliary information 233 may indicate information of storage device 200.

Figure 3:
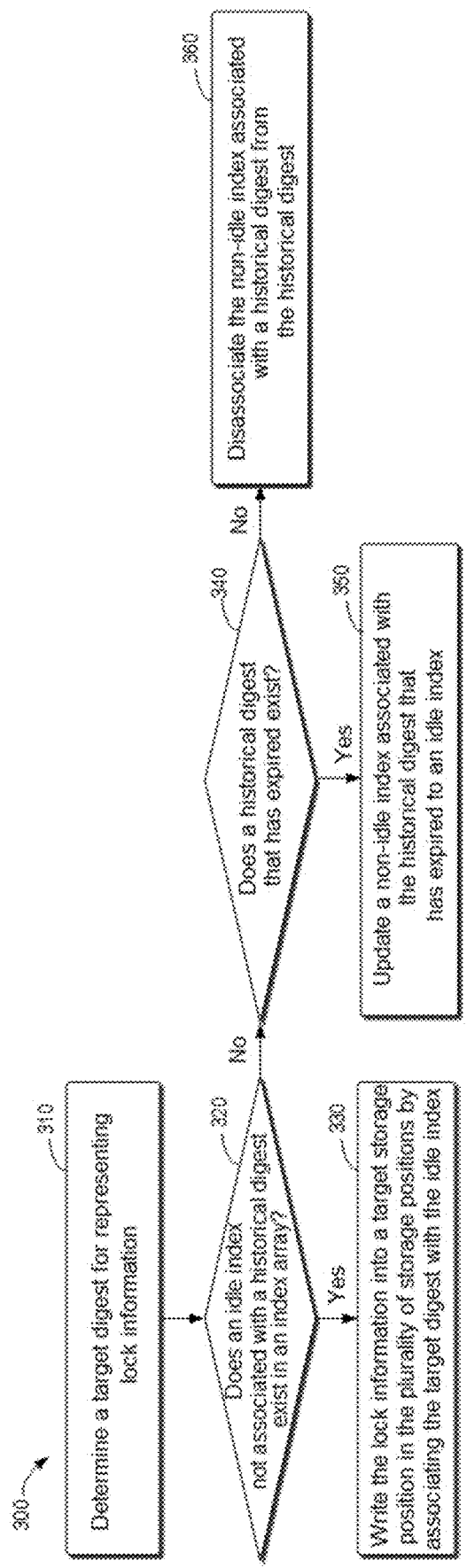
FIG. 3 is a flowchart of a process for storage management according to some embodiments of the present disclosure.

FIG. 3 is a flowchart of process 300 for storage management according to an embodiment of the present disclosure. In some embodiments, process 300 may be implemented in system 100 in FIG. 1, particularly at any one of storage devices 101 to 104. Process 300 may also be implemented at storage device 200 in FIG. 2. In addition, process 300 may also be implemented at a computing device in the storage device in FIG. 1 or FIG. 2. For illustrative purposes, descriptions will be provided below with reference to the storage system architectures in FIG. 1 and FIG. 2. However, it should be understood that process 300 may not be limited to the applications illustrated in FIG. 1 and FIG. 2, but may be applied to any other suitable types of storage systems.

In block 310, if a storage device determines that lock information associated with a lock operation performed on an object is to be inserted into the storage device, the storage device determines a target digest for representing the lock information.

In some embodiments, the storage device may acquire a lock address of a locked object from the lock information and determine the target digest based on the lock address.

In block 320, the storage device determines whether an idle index not associated with a historical digest exists in an index array for indicating a plurality of storage positions in the storage device. As described above, the index array and the digest array have a completely corresponding positional relationship. Therefore, when lock information of the locked object arrives, it is necessary to determine whether an idle index exists, that is, the index position has not been associated with any historical digest.

In block 330, if the storage device determines that an idle index not associated with a historical digest exists, the storage device inserts the lock information into a target storage position in the plurality of storage positions by associating the target digest with the idle index.

In some embodiments, the storage device may determine, from the plurality of storage positions, a target storage position allocated for the idle index. As mentioned above, an index in the index array may store a slot identifier of the content data. The slot may, for example, be allocated for the index by a slot distributor. Since the index array and the digest array have a completely corresponding positional relationship, the storage device may establish a mapping relationship between the target storage position and the target digest by associating the target digest with the idle index, and then may insert the lock information into the target storage position based on the mapping relationship.

In block 340, if the storage device determines that an idle index not associated with a historical digest does not exist, the storage device may determine whether a historical digest that has expired exists. Here, the historical digest that has expired indicates that the lock information associated with the historical digest has been cleared, for example, because unlock information associated with the lock information has been received before. As described above, after the content data is cleared, holes may appear in positions of the digest array where the digests were originally stored, and the holes indicate historical digests that have expired.

In block 350, if the storage device determines that the historical digest that has expired exists, the index array may be updated based on the historical digest that has expired for generating an idle index. In some embodiments, the storage device may perform a compression operation, such as compressing forward from the position where the insertion cursor is located, for eliminating the holes in the digest array. Therefore, an idle position where no digest is stored may appear at the tail of the digest array. Since the index array and the digest array have a completely corresponding positional relationship, the idle index may be generated at a position in the index array and corresponding to the idle position in the digest array.

In block 360, if the storage device determines that no historical digest that has expired exists, it means that no compressible hole exists in the digest array, and thus a corresponding idle index cannot be generated. Therefore, in order to ensure the system performance, the storage device may be released, and the background of the TRS where all the digests and content data have been flushed performs subsequent processing. Therefore, the storage device may disassociate a non-idle index in the index array from the historical digest and clear historical lock information stored in a used storage position indicated by the non-idle index.

Figure 4:
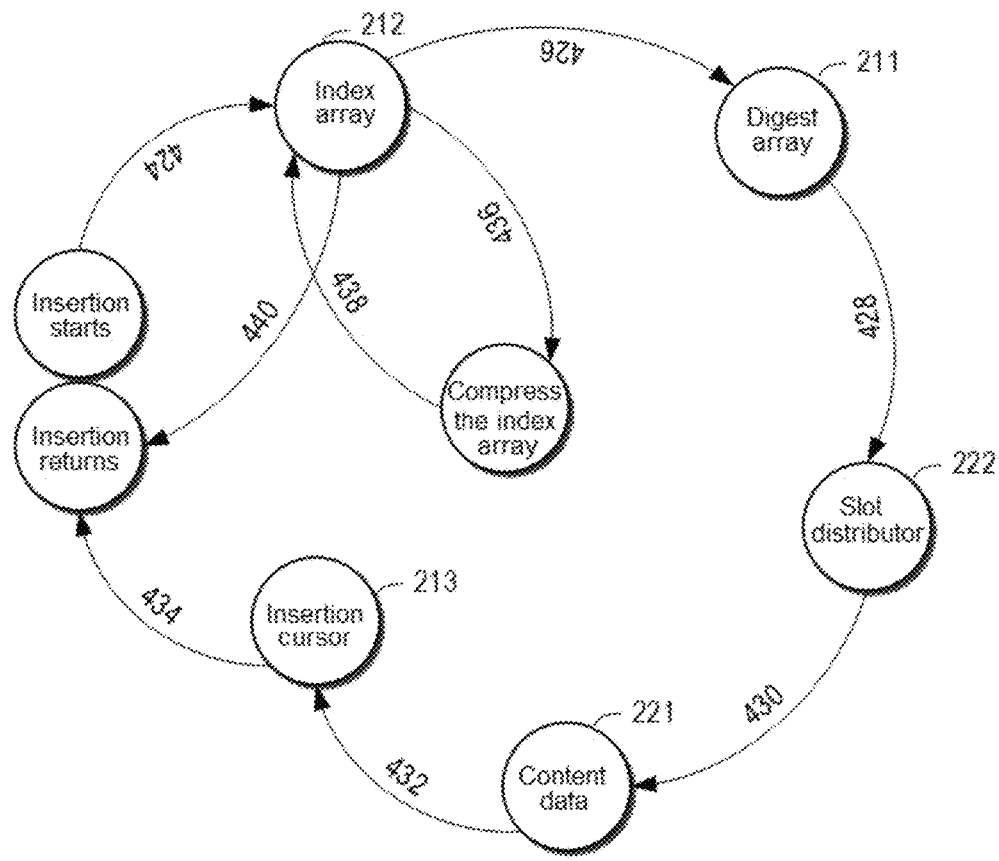
FIG. 4 is a schematic diagram of a process for inserting lock information into a storage device according to some embodiments of the present disclosure.
Figure 4:
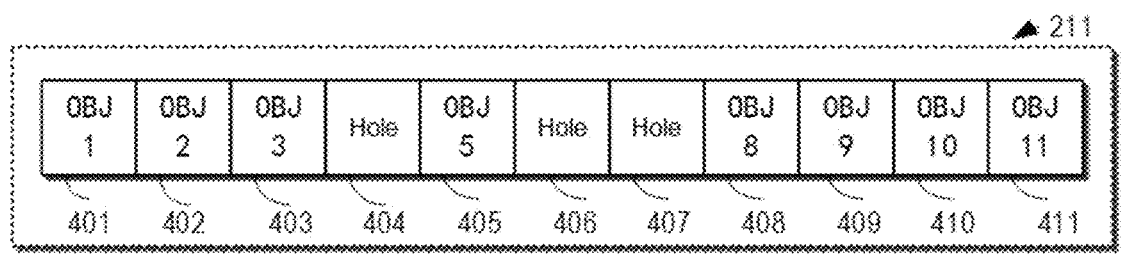
Figure 4:
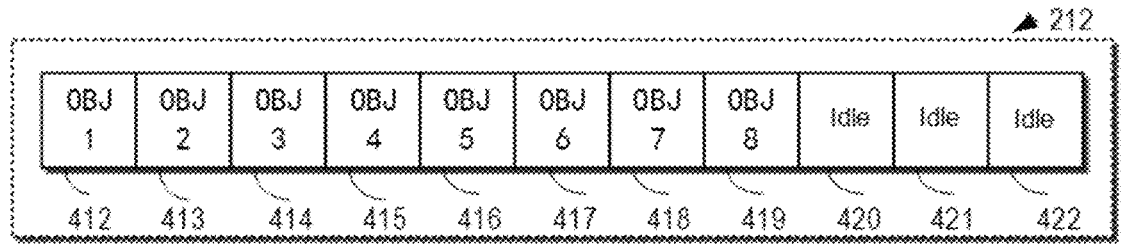

FIG. 4 is a schematic diagram of a process for inserting lock information into a storage device according to some embodiments of the present disclosure. Flowchart 300 shown in FIG. 3 is further described below with reference to FIG. 4.

When the storage device receives lock information that is to be inserted into the storage device and associated with a lock operation performed on an object, an insertion process of the lock information starts. The storage device may determine 424 whether an idle index not associated with a historical digest exists in index array 212. If it is determined that the idle index exists, it means that an idle position where a digest can be stored exists in digest array 211, and the storage device may calculate 426 a digest of the lock information and insert the digest into the idle position of digest array 211.

Next, the storage device may request 428 slot distributor 222 to allocate a corresponding storage position (for example, a slot identifier) for the idle index, and establish an association relationship between the storage position and the digest. Based on the association relationship, the lock information corresponding to the digest may be inserted 430 into the allocated storage position in data content 221.

After content of the lock information is inserted into the storage device, an insertion cursor may be added 432, that is, cursors in the index array and the digest array are moved one position back. After that, the insertion process described above may be ended 434.

Back to action 402, if the storage device determines that an idle index not associated with a historical digest does not exist in index array 212, a compression process of index array 212 and digest array 211 may be triggered 436.

Referring to FIG. 4, digest array 211 may include positions 401-411 for storing the digests. A current insertion cursor of digest array 211 should be located after position 411. As can be seen, a corresponding digest is also stored at position 411, and therefore, it means that digest array 211 has no idle position for storing the digest. However, there are holes at positions 404, 406, and 407 of digest array 211, respectively. As described above, the holes may indicate historical digests that have expired, and data content corresponding to the historical digests has been cleared. Therefore, the holes may be cleared during the compression process to obtain new idle positions.

Since index array 212 and digest array 211 have a completely corresponding positional relationship, after compression, index array 212 may be synchronously updated 438 based on the idle positions of digest 211. As shown in FIG. 4, positions 420-422 in digest array 212 are idle indexes. At this time, the insertion cursor of digest array 212 may point to position 420. When the next round of the insertion process starts, whether an available idle index exists may be searched from the position.

If it is determined that digest array 211 has no position space available for compression, it may be considered that the insertion process fails, and the storage device may suspend 440 the insertion process.

In addition, in some embodiments, if the storage device receives unlock information associated with an unlock operation for a locked object, the storage device may determine another target digest for representing the unlock information. The storage device may determine, from candidate digests that have been associated with indexes in the index array, whether a reference digest matching the another target digest exists. If the storage device determines that the reference digest exists, the storage device determines whether reference lock information matches the unlock information. If it is determined that the reference lock information matches the unlock information, the reference lock information may be cleared from the storage device.

In some embodiments, if the storage device determines that no reference digest exists or the reference lock information does not match the unlock information, the unlock information may be inserted into an available storage position in the plurality of storage positions. As mentioned above, such unlock information may be regarded as lonely unlock information or unmatched unlock information.

Figure 5:
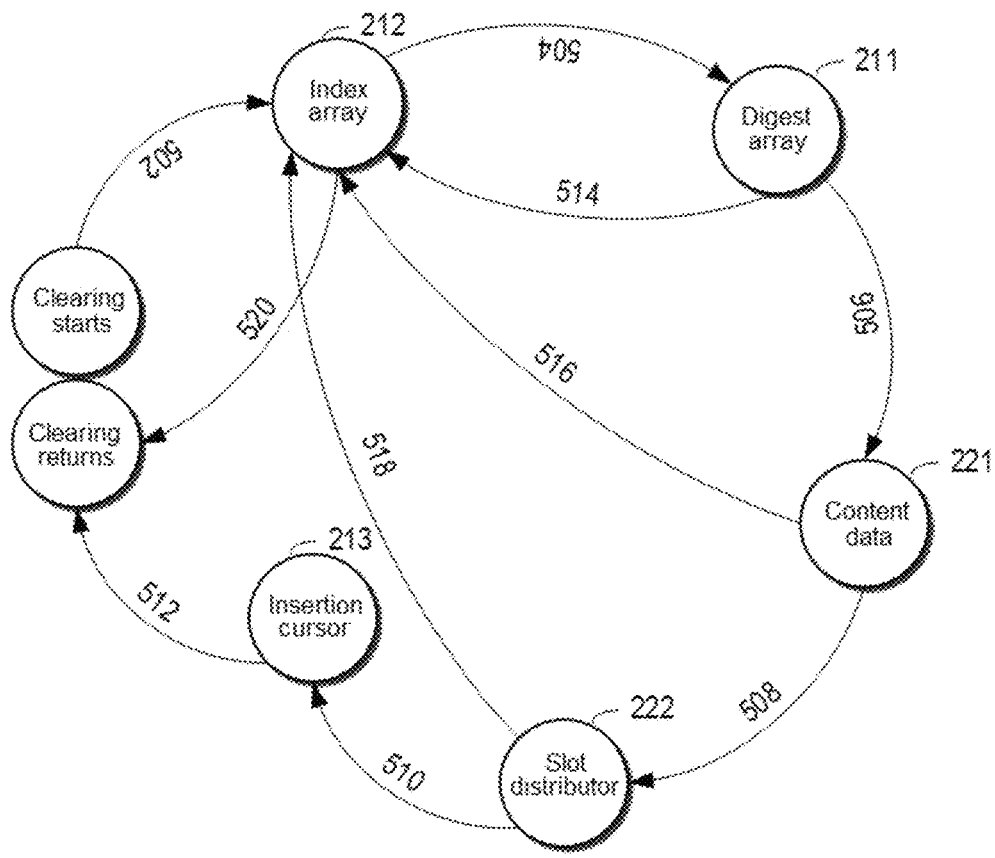
FIG. 5 is a schematic diagram of a process for clearing lock information from a storage device according to some embodiments of the present disclosure.
Figure 5:
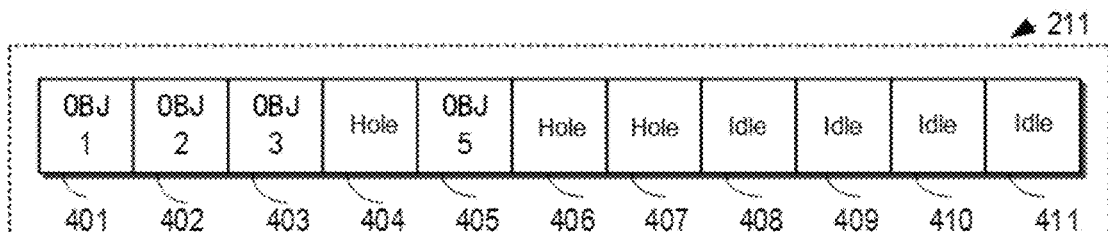
Figure 5:
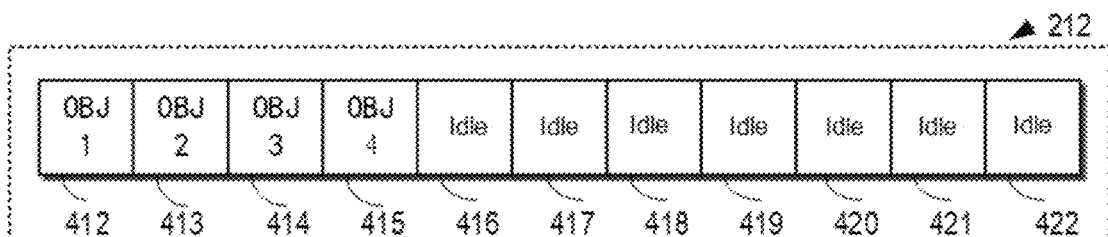

FIG. 5 is a schematic diagram of a process for clearing lock information from a storage device according to some embodiments of the present disclosure. The process of clearing the lock information from the storage device is further described below with reference to FIG. 5.

When the storage device receives unlock information associated with an unlock operation performed on an object, the process of clearing the lock information starts. The storage device may acquire 502 a valid index in index array 212 based on a current position of an insertion cursor, for determining the position where a search starts. The storage device may calculate a digest of the unlock information and compare 504 the digest with a digest at the position corresponding to the valid index stored in digest array 211, for determining whether a digest matching the digest associated with the unlock information exists in the digest array.

If it is determined that the matching digest exists, the storage device finds, according to the digest, content data 221 storing the lock information associated with the digest and checks 506 whether content of the lock information matches content in the unlock information. If it is determined that the content of the lock information matches the content in the unlock information, the lock information stored in the storage device may be cleared and the storage position in slot distributor 222 is set 508 to available. Slot distributor 222 may further set 518 an index, which indicates a storage position associated with the cleared lock information, in the index array to idle.

Correspondingly, the position of the digest associated with the lock information and stored in digest array 211 may be set to invalid, that is, a hole appears at the position. If insertion cursor 213 is currently located at the position of this hole, insertion cursor 213 may further perform 510 hole compression. As shown in FIG. 5, if insertion cursor 213 is currently at position 408 in digest array 211, which has just become idle due to the cleared lock information, hole compression may be started for the digest array, that is, spaces where 404, 406, and 407 are located are compressed. After compression, it can be seen that index positions 416-422 in index array 212 are set to idle indexes. After that, the clearing process described above may be ended 512.

Back to actions 504 and 506, if it is determined that no matching digest exists or the content of the lock information does not match the content of the unlock information, a next valid index in index array 212 may be acquired 516, 518 and action 504 is performed again. If no next valid index exists, the storage device may suspend 520 the clearing process.

In this way, the storage device in the embodiment of the present disclosure can quickly insert and clear lock information, thereby improving the system performance.

Figure 6:
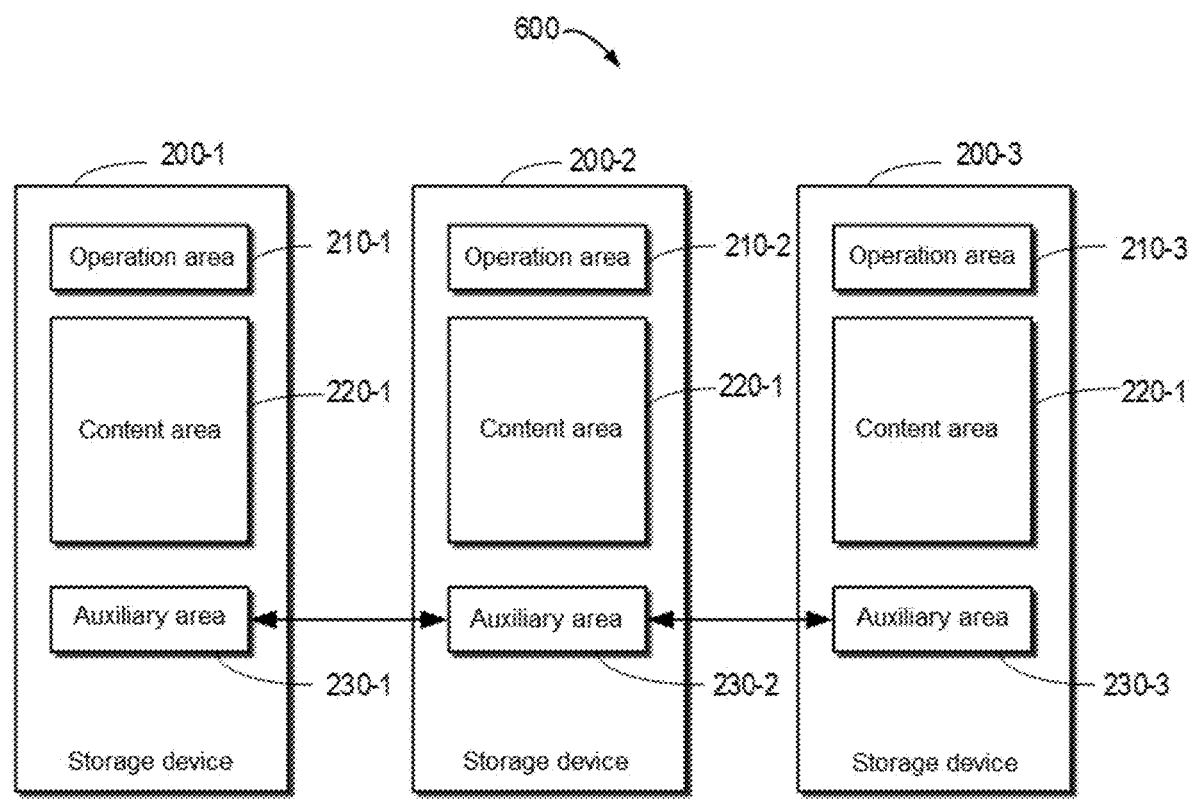
FIG. 6 is a schematic diagram of a storage device according to some embodiments of the present disclosure.

FIG. 6 is a schematic diagram of a storage device according to some embodiments of the present disclosure. As shown in FIG. 6, storage device 600 may include a plurality of storage sub-devices 200-1, 200-2, and 200-3. Each storage sub-device may be regarded as storage device 200 shown in FIG. 2 and has the same or similar architecture as storage device 200.

For example, storage sub-device 200-1 may include operation area 210-1, content area 220-1, and auxiliary area 230-1. Storage sub-device 200-2 may include operation area 210-2, content area 220-2, and auxiliary area 230-2. Storage sub-device 200-3 may include operation area 210-3, content area 220-3, and auxiliary area 230-3. As described above, the auxiliary area may include a pointer of a previous buffer and a pointer of a next buffer, which may be used for establishing a connection between the storage sub-devices.

Figure 7:
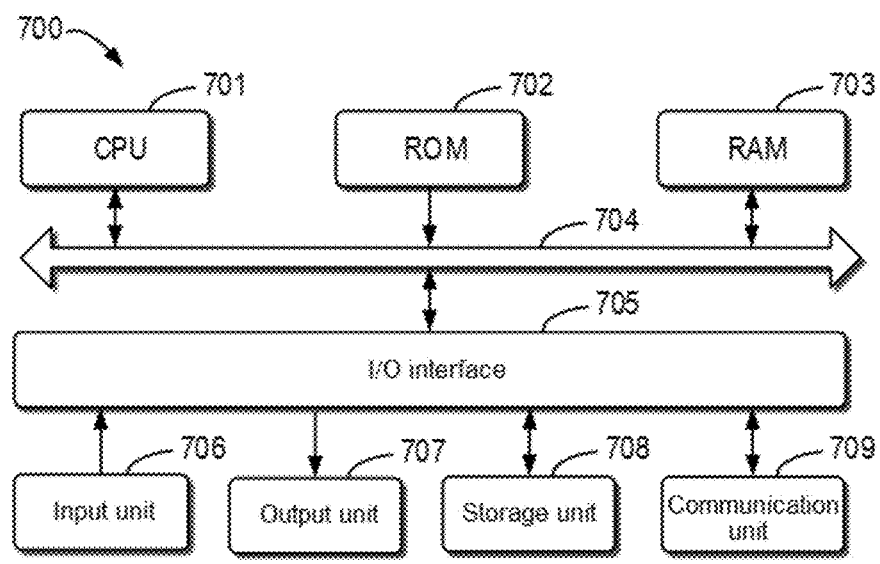
FIG. 7 is a schematic block diagram of a device that can be configured to implement an embodiment of the present disclosure.

FIG. 7 schematically illustrates a block diagram of device 700 that can be configured to implement an embodiment of the present disclosure. Device 700 may be implemented as or included in any one of storage devices 101 to 104 in FIG. 1, and may also be implemented as or included in storage device 200 in FIG. 2.

As shown in FIG. 7, device 700 includes central processing unit (CPU) 701 which may execute various appropriate actions and processing in accordance with computer program instructions stored in read-only memory (ROM) 702 or computer program instructions loaded onto random access memory (RAM) 703 from storage unit 708. Various programs and data required for operations of device 700 may also be stored in RAM 703. CPU 701, ROM 702, and RAM 703 are connected to each other through bus 704. Input/output (I/O) interface 705 is also connected to bus 704.

A plurality of components in device 700 are connected to I/O interface 705, including: input unit 706, such as a keyboard and a mouse; output unit 707, such as various types of displays and speakers; storage unit 708, such as a magnetic disk and an optical disc; and communication unit 709, such as a network card, a modem, and a wireless communication transceiver. Communication unit 709 allows device 700 to exchange information/data with other devices over a computer network such as the Internet and/or various telecommunication networks.

The various processes and processing described above, such as process 300, process 500, and/or process 600, may be performed by processing unit 701. For example, in some embodiments, process 300, process 500, and/or process 600 may be implemented as a computer software program that is tangibly included in a machine-readable medium, for example, storage unit 708. In some embodiments, part or all of the computer program may be loaded and/or installed onto device 700 via ROM 702 and/or communication unit 709. When the computer program is loaded onto RAM 703 and executed by CPU 701, one or more steps of process 300, process 500, and/or process 600 described above may be performed.

As used herein, the term "include" and similar terms thereof should be understood as open-ended inclusion, that is, "including, but not limited to." The term "based on" should be understood as "based at least in part on." The term "one embodiment" or "this embodiment" should be understood as "at least one embodiment." The terms "first," "second," etc. may refer to different or the same objects. Other explicit and implicit definitions may also be included herein.

As used herein, the term "determine" encompasses a variety of actions. For example, "determine" may include operating, computing, processing, exporting, surveying, searching (for example, searching in a table, database, or another data structure), identifying, and the like. In addition, "determine" may include receiving (for example, receiving information), accessing (for example, accessing data in a memory), and the like. In addition, "determine" may include parsing, selecting, choosing, establishing, and the like.

It should be noted that the embodiments of the present disclosure can be implemented by hardware, software, or a combination of software and hardware. The hardware part may be implemented using dedicated logic. The software part may be stored in a memory and executed by an appropriate instruction execution system, such as a microprocessor or dedicated design hardware. Those skilled in the art can understand that the devices and methods described above may be implemented using computer-executable instructions and/or included in processor control code, for example, such code is provided in a programmable memory or on a data carrier such as an optical or electronic signal carrier.

In addition, although the operations of the method of the present disclosure are described in a specific order in the accompanying drawings, this does not require or imply that these operations must be performed in the specific order, or that all the operations shown must be performed to achieve a desired result. Conversely, the order of execution for the steps depicted in the flowchart can be changed. Additionally or alternatively, some steps may be omitted, a plurality of steps may be combined into one step for execution, and/or one step may be decomposed into a plurality of steps for execution. It should be further noted that the features and functions of two or more apparatuses according to the present disclosure may be embodied in one apparatus. On the contrary, the features and functions of one apparatus described above may be embodied by further dividing the apparatus into a plurality of apparatuses.

Although the present disclosure has been described with reference to a number of specific embodiments, it should be understood that the present disclosure is not limited to the specific embodiments disclosed. The present disclosure is intended to cover various modifications and equivalent arrangements included in the spirit and scope of the appended claims.

The invention claimed is:

1. A method of managing a lock tracking system of a storage system, comprising:
   in response to determining that lock information associated with a lock operation performed on an object is to be inserted into a buffer cache of the storage system, generating a target digest representing the lock information, the target digest to be stored in a position of a digest array in the buffer cache, wherein positions of the digest array are associated with corresponding positions of an index array in the buffer cache, the index array storing locations of content data elements in the buffer cache, the content data elements storing object-related lock information;
   locating an idle index not corresponding to a digest array position that stores a historical digest, the idle index being a position in the index array;
   storing the target digest in a target position of the digest array, the target position corresponding in position to the idle index;
   inserting the lock information into a target content data element at a storage location in the buffer cache, the storage location being separate from the index array and digest array;
   storing, in the idle index, the storage location of the target content data element;
   in response to the lock information being cleared, setting the target position of the digest array to invalid and performing hole compression on the target position of the digest array, the hole compression (i) causing a digest stored at a position preceding the target position to become adjacent to a digest stored at a position subsequent to the target position and (ii) causing a storage location stored at an index preceding the idle index to become adjacent to a storage location stored at an index subsequent to the idle index.

2. The method of claim 1, wherein determining the target digest comprises:
   acquiring a lock address of a locked object from the lock information; and
   determining the target digest based on the lock address.

3. The method of claim 1, further comprising:
   locating, from among the positions of the index array, a position corresponding to a digest array position storing a historical digest that has expired; and
   updating the index array based on the historical digest that has expired to generate a second idle index.

4. The method of claim 1, further comprising:
   disassociating a non-idle index that has been associated with a digest array position that stores a historical digest from the historical digest; and
   clearing historical lock information inserted into a used content data element whose storage location is stored in the non-idle index.

5. The method of claim 1, wherein inserting the lock information into a target content data element comprises:
   determining, from a plurality of content data elements, a target content data element allocated for the idle index;
   establishing a mapping relationship between the target content data element and the target digest by associating the target digest with the idle index; and
   inserting the lock information into the target content data element based on the mapping relationship.

6. The method of claim 1, further comprising:
   generating, in response to receiving unlock information associated with an unlock operation for a locked object, another target digest for representing the unlock information;
   determining, from candidate digests stored in digest array positions corresponding to the positions of the index array, whether a reference digest matching the another target digest exists;
   determining, in response to determining that the reference digest exists, whether reference lock information represented by the reference digest matches the unlock information; and
   clearing, in response to determining that the reference lock information matches the unlock information, the reference lock information from the storage device.

7. The method of claim 6, further comprising:
   inserting the unlock information into an available content data element in a plurality of content data elements.

8. The method of claim 1, wherein the positions of the digest array have a corresponding positional relationship with the positions of the index array;
   wherein performing the hole compression is further in response to determining that each of the positions of the index array is associated with a digest stored in a respective position of the digest array; and
   wherein performing the hole compression further includes inserting an idle position at a tail of the digest array and inserting a second idle index at a tail of the index array.

9. The method of claim 1, wherein locating the idle index includes:
   accessing an insertion cursor indicating a starting position in the index array; and starting from the starting position, searching positions in the index array to locate the idle index as an available index; and wherein the method further comprises:

after locating the idle index, incrementing the insertion cursor to indicate a new starting position in the index array to perform a subsequent search operation.

10. An electronic device, comprising:

at least one processor; and at least one memory storing computer program instructions, the at least one memory and the computer program instructions being configured to cause, with the at least one processor, the electronic device to perform actions comprising:

in response to determining that lock information associated with a lock operation performed on an object is to be inserted into a buffer cache of the storage system, generating a target digest representing the lock information, the target digest to be stored in a position of a digest array in the buffer cache, wherein positions of the digest array are associated with corresponding positions of an index array in the buffer cache, the index array storing locations of content data elements in the buffer cache, the content data elements constructed and arranged to store object-related lock information;

locating an idle index corresponding to a digest array position that stores a historical digest, the idle index being a position in the index array;

storing the target digest in a target position of the digest array, the target position corresponding in position to the idle index;

inserting the lock information into a target content data element at a storage location in the buffer cache, the storage location being separate from the index array and digest array; and storing, in the idle index, the storage location of the target content data element;

in response to the lock information being cleared, setting the target position of the digest array to invalid and performing hole compression on the target position of the digest array, the hole compression (i) causing a digest stored at a position preceding the target position to become adjacent to a digest stored at a position subsequent to the target position and (ii) causing a storage location stored at an index preceding the idle index to become adjacent to a storage location stored at an index subsequent to the idle index.

11. The electronic device of claim 10, wherein determining the target digest comprises:

acquiring a lock address of a locked object from the lock information; and determining the target digest based on the lock address.

12. The electronic device of claim 10, wherein the actions further comprise:

locating, from among the positions of the index array, a position corresponding to a digest array position storing a historical digest that has expired; and updating the index array based on the historical digest that has expired to generate a second idle index.

13. The electronic device of claim 10, wherein the actions further comprise:

disassociating a non-idle index that has been associated with a digest array position that stores a historical digest from the historical digest; and clearing historical lock information inserted into a used content data element whose storage location is stored in the non-idle index.

14. The electronic device of claim 10, wherein inserting the lock information into a target content data element comprises:

determining, from a plurality of content data elements, a target content data element allocated for the idle index;

establishing a mapping relationship between the target content data element and the target digest by associating the target digest with the idle index; and inserting the lock information into the target content data element based on the mapping relationship.

15. The electronic device of claim 10, wherein the actions further comprise:

generating, in response to receiving unlock information associated with an unlock operation for a locked object, another target digest for representing the unlock information;

determining, from candidate digests stored in digest array positions corresponding to the positions of the index array, whether a reference digest matching the another target digest exists;

determining, in response to determining that the reference digest exists, whether reference lock information represented by the reference digest matches the unlock information; and clearing, in response to determining that the reference lock information matches the unlock information, the reference lock information from the storage device.

16. The electronic device of claim 15, wherein the actions further comprise:

inserting the unlock information into an available content data element in a plurality of content data elements.

17. A computer program product having a non-transitory computer readable medium which stores a set of instructions to perform storage management; the set of instructions, when carried out by computerized circuitry, causing the computerized circuitry to perform a method of:

in response to determining that lock information associated with a lock operation performed on an object is to be inserted into a buffer cache of the storage system, generating a target digest representing the lock information, the target digest to be stored in a position of a digest array in the buffer cache, wherein positions of the digest array are associated with corresponding positions of an index array in the buffer cache, the index array storing locations of content data elements in the buffer cache, the content data elements storing object-related lock information;

locating an idle index not corresponding to a digest array position that stores a historical digest, the idle index being a position in the index array;

storing the target digest in a target position of the digest array, the target position corresponding in position to the idle index;

inserting the lock information into a target content data element at a storage location in the buffer cache, the storage location being separate from the index array and digest array; and storing, in the idle index, the storage location of the target content data element;

in response to the lock information being cleared, setting the target position of the digest array to invalid and performing hole compression on the target position of the digest array, the hole compression (i) causing a digest stored at a position preceding the target position to become adjacent to a digest stored at a position subsequent to the target position and (ii) causing a storage location stored at an index preceding the idle index to become adjacent to a storage location stored at an index subsequent to the idle index.

18. The method of claim 1, wherein locating the idle index is performed using an insertion cursor indicating a starting search position in the index array; and wherein the method further comprises, in response to storing the location of the target content data element, incrementing the insertion cursor.

\* \* \* \* \*